Figure 1:
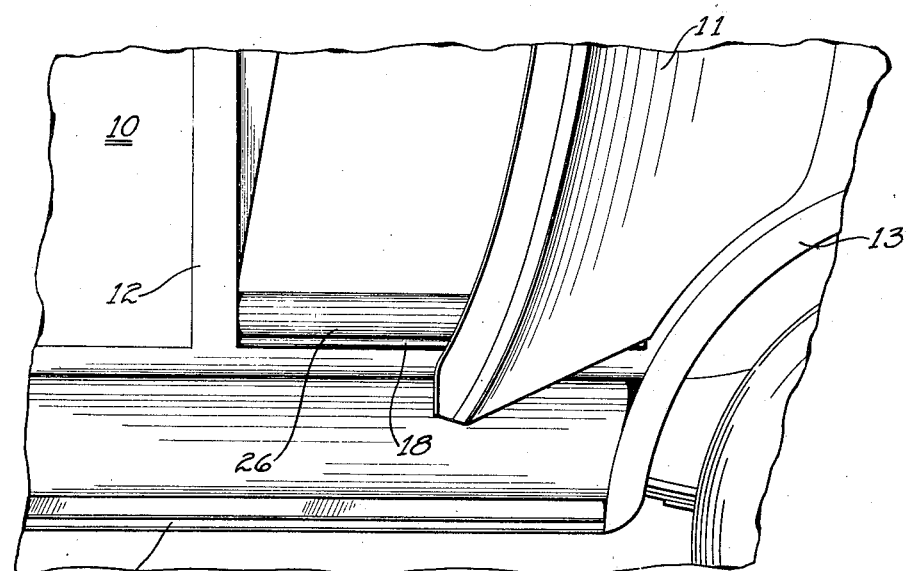

Dec. 30, 1930.  E. F. ROBERTS  1,787,169
MOTOR VEHICLE BODY
Filed Aug. 11, 1926

Inventor
EDWARD F. ROBERTS
By  
Attorney

Patented Dec. 30, 1930

1,787,169

UNITED STATES PATENT OFFICE

EDWARD F. ROBERTS, OF DETROIT, MICHIGAN, ASSIGNOR TO PACKARD MOTOR CAR COMPANY, OF DETROIT, MICHIGAN, A CORPORATION OF MICHIGAN

MOTOR-VEHICLE BODY

Application filed August 11, 1926. Serial No. 128,550.

This invention relates to motor vehicles, more particularly to the bodies of such vehicles, and it has for one of its objects to provide a device by which the entry of wind, water and dirt to the interior of the body through the space between the vehicle door and the floor thereof, shall be prevented.

Another object of the invention is to provide an efficient weatherstrip or sealing strip for the bottom of vehicle doors, which shall be sturdy and reliable and of good appearance.

A further object of the invention is to provide means to securely attach such a sealing device to the vehicle body, so that all nails, screws and tacks shall be concealed, and so that the device with its attaching means shall have an ornamental value as a moulding or trim member on the body.

Figures 2, 3:
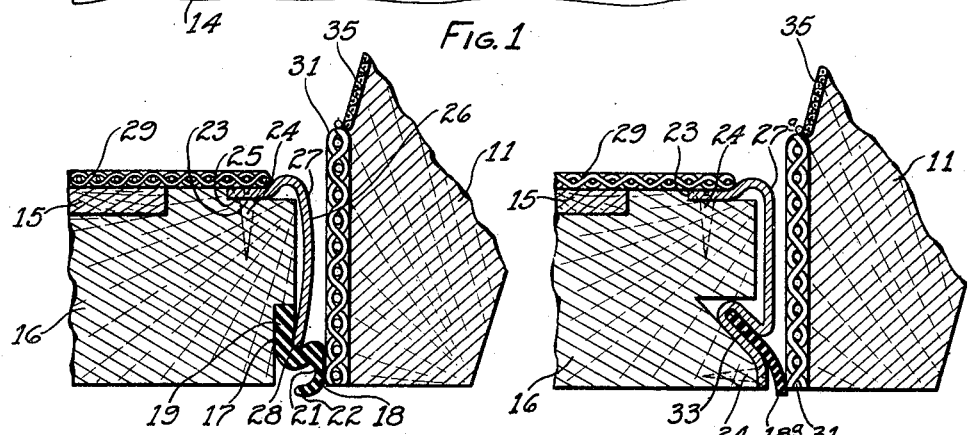
Figure 4:
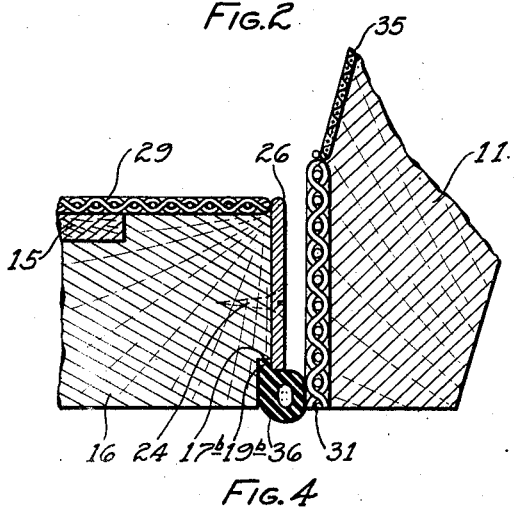

Other objects of the invention will appear from the following description taken in connection with the drawing, which forms a part of this specification, and in which:

Fig. 1 is a side view of a portion of a motor vehicle body showing the application of the invention thereto, and Figs. 2, 3 and 4 are cross-sections illustrating some forms of the invention, taken in a vertical plane through the bottom of the closed vehicle door and at right angles thereto.

Referring to the drawing, at 10 is illustrated a portion of the body of a motor vehicle, having a door 11 mounted on suitable hinges (not shown), and adapted to be swung to a closed position adjacent a door pillar 12 in the well known manner. The vehicle is provided with the usual fenders 13 and running board 14, and its body is provided with a floor 15 supported on suitable floor sills 16. In the type of body illustrated, the door 11 extends downwardly so that its lower edge is below the level of the floor 15, and when the door is closed it occupies a position in spaced relation with the outer edge of the floor and with the side of the outside body sill 16. The present invention provides means by which wind is prevented from blowing through the space thus formed between the sill and the door, and by which the entry of road dust and water to the body therethrough is also prevented.

The preferred construction for the accomplishment of the objects of the invention is best shown in Fig. 2, in which the body sill 16 is rabbeted as shown at 17 for the reception of a sealing member or weatherstrip 18. This sealing member 18 may be formed of a strip of soft rubber or other suitable resilient material and it has an upwardly disposed portion 19, adapted to seat in the rabbet 17, and a downwardly and outwardly disposed portion 21, the edge of which is bent over to form a U-shaped section, as shown at 22.

The upper face of the sill 16 is also slightly recessed as shown at 23 and in this recess is suitably secured, as by means of wood screws 24, the flange portion 25 of a trim member or moulding 26, preferably formed of resilient and non-corrosive metal such as brass, and which has a downwardly disposed portion 27. This portion 27 is slightly convex outwardly from the sill 16, and its lower edge 28 is adapted to engage the sealing member 18 substantially at the junction between the portions 18 and 21 thereof. By reason of the resilience of the member 26, this edge 28 presses inwardly against the portion 19 of the weatherstrip 18, thus clamping it securely against the face of the sill 16. The floor 15 of the vehicle is covered by a suitable rug or carpet 29, which extends laterally to cover the flange or attachment portion of the member 26, so that the heads of the screws 24 are concealed beneath the edge of the carpet.

The lower portion of the door 11 is also lined with carpet or other suitable material 31 of a similar nature, the upper portion of the door, above the lining 31, being covered with any suitable fabric 35 in the well known manner. Upon closing the door it will be evident that the lining 31 carried thereby, strikes upon the outwardly disposed portion 21 of the strip 17, thus compressing and slightly deforming it, so that it has a close bearing upon the inner face of the door 11.

It will be apparent that in this construction the portion 21 of the strip 28 is pressed tightly into engagement with the inner face of the door 11 when the latter is closed, thus forming an effective seal against the entry of air, water, and dirt or dust.

In Fig. 3 is illustrated another form in which the invention may be embodied, and in which the trim member 27ª is provided with a groove or longitudinal pocket 33 adapted to receive and support one edge of a resilient sealing strip or member 18ª. In this construction the trim member 27ª, which may conveniently be a stamping of light sheet brass, is secured to the sill 16 by two rows of screws 24, one of which secures the upper edge in the rabbet 23 and the other securing the lower edge to the sill. The resilient strip 18ª projects in a downwardly inclined direction from its groove 33 toward the door 11, and upon closing the door the trim carpet 31 bears against the lower edge of the member 18ª, thus bending and depressing it so as to make a tight seal with the inside of the door.

In Fig. 4 is illustrated a slightly different form of the invention. In this device the sealing member comprises a tube 36, which is preferably of rubber or other suitable material, and which may be covered with a hard, wear resisting fabric if desired. This weatherstrip is provided with an upwardly extending flange portion 19ᵇ, which is adapted to fit in a groove or rabbet 17ᵇ in the lower outside edge of the body sill. It is clamped in position in this recess by means of a trim plate 26, which plate is secured to the side face of the sill 16 in any convenient manner, as by means of screws 24. In this device upon closing the door 11 the tube 36, will be deformed or compressed into an elliptical shape by the side of the sill and the corresponding face of the door, so as to tightly seal the space therebetween.

It will be seen that this invention provides a highly efficient device for closing vehicle bodies at the bottom of the doors thereof, which device is simple and inexpensive, and which serves as a trim for the finish of the vehicle body at this point.

It will be understood that various forms of the invention other than those described above may be used without departing from the spirit or scope of the invention.

Having thus described the invention, what is claimed and desired to be secured by Letters Patent, is:

1. In a vehicle body having a sill and a door, a sealing strip having an attaching portion and a sealing portion, and a groove between said portions, a resilient metal moulding secured to the sill above the strip and having a depending edge adapted to engage in the groove to clamp the strip to said sill.

2. In a vehicle body, a floor sill, a door adapted to close into spaced relation with said sill, a trim member secured to the top of said sill and having a downwardly projecting portion, and a resilient member secured to the sill by the downwardly projecting portion of said trim member and adapted to engage said door when closed.

3. In a vehicle body, a floor having a sill and adapted to support a carpet, a door for said body adapted to close into spaced relation with said floor, a weatherstrip carried by the sill and adapted to be engaged by the door when closed, a resilient metal member secured to said sill and adapted to clamp the weatherstrip to said sill, and means attaching the metal member to said sill and concealed by said carpet.

4. In a vehicle body having a floor sill, a floor, a covering for the floor and a door, a weather strip adaptable for engagement by the door and a resilient member providing an abutment for the covering and a securing means for the weather strip.

5. In a vehicle body having a floor sill, a floor, a covering for the floor and a door, a weather strip adaptable for engagement by the door, a resilient member securing the weather strip in position and a turned edge on the resilient member providing an abutment for the floor covering.

6. In a vehicle body having a floor sill, a floor, a covering for the floor and a door, a weather strip adaptable for engagement by the door, a resilient member attached to the sill by one edge and adapted to secure the weather strip in position by its other edge and means on the resilient member providing an abutment for the floor covering.

7. In a vehicle body having a floor sill, a floor, a covering for the floor and a door, a weather strip adaptable for engagement by the door, a resilient member securing the weather strip to the sill and providing an abutment for the floor covering and means concealed beneath the floor covering for securing the resilient member to the sill.

In testimony whereof I affix my signature.

EDWARD F. ROBERTS.